(12) United States Patent
Koorakula et al.

(10) Patent No.: US 9,292,880 B1
(45) Date of Patent: Mar. 22, 2016

(54) CIRCLE MODEL POWERED SUGGESTIONS AND ACTIVITIES

(75) Inventors: Naveen Koorakula, San Franciso, CA (US); Sakina Arsiwala, San Francisco, CA (US); Sebastian Heycke, San Francisco, CA (US); Jonas Werner Huckestein, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 803 days.

(21) Appl. No.: 13/452,469

(22) Filed: Apr. 20, 2012

Related U.S. Application Data

(60) Provisional application No. 61/478,374, filed on Apr. 22, 2011.

(51) Int. Cl.
*G06Q 30/02* (2012.01)
*G06Q 10/10* (2012.01)
*G06Q 10/06* (2012.01)
*G06Q 40/02* (2012.01)
*G06Q 99/00* (2006.01)
*G06Q 50/00* (2012.01)

(52) U.S. Cl.
CPC ................................. *G06Q 50/01* (2013.01)

(58) Field of Classification Search
CPC ....................................................... G06Q 50/01
USPC .................................................. 705/1.1–912
See application file for complete search history.

(56) References Cited

U.S. PATENT DOCUMENTS

| 7,539,697 | B1 * | 5/2009 | Akella et al. | |
| 8,019,692 | B2 * | 9/2011 | Rosen | 705/319 |
| 8,271,506 | B2 * | 9/2012 | Martinez et al. | 707/755 |
| 2011/0246574 | A1 * | 10/2011 | Lento et al. | 709/204 |
| 2012/0197723 | A1 * | 8/2012 | Watfa et al. | 705/14.58 |

* cited by examiner

*Primary Examiner* — Jonathan Ouellette
(74) *Attorney, Agent, or Firm* — Alston & Bird LLP

(57) ABSTRACT

The circle model powered suggestions and activities system provides a way to efficiently and effectively manage relationships. The circle model powered suggestions and activities system provides a way to model relationships for a user and assist the user with creating groupings of relevant constituents into context circles, provide suggested activities to members of the modeled relationships as well as facilitate the user with managing the user's relationships. The system analyzes public and private data, and tracks the user's interactions and the interactions of the constituents' of the user in order to generate suggested activities (including conversation starters) for the users and the constituents of the users. The system refines the semantic analysis and learning algorithms used to perform the analysis by analyzing the activities engaged in by the users and the constituents of the users related to suggested activities.

27 Claims, 7 Drawing Sheets

CIRCLE MODEL POWERED SUGGESTIONS AND ACTIVITIES

RELATED APPLICATIONS

This application claims priority to U.S. Provisional Patent Application Ser. No. 61/478,374, filed Apr. 22, 2011, which is also incorporated herein by reference in its entirety.

TECHNICAL FIELD

The present description relates to how to efficiently and effectively implement a way to manage relationships. More specifically, the present description relates to a way to model relationships for a user, provide suggested activities to members of the modeled relationships as well as facilitate the user with managing the user's relationships.

BACKGROUND

Advancements in technology over the last several decades have made communication easier and cheaper than ever before in human history. On the one end, e-mail, SMS and instant messaging systems have made one-to-one communication very easy and convenient. On the other end, social networking systems have made communication with larger groups of interested parties easier. However, a vast majority of human interactions happen in small social circles (e.g., in groups ranging from three to the teens). Technology has not been very effective at making small social circles of communication easier and simpler.

Current solutions lack the ability to allow people to conceptualize the circles the people are a part of approximately the same. For example, Alice may consider her circle of college friends to include Bob, Charles and herself, while Bob may think of the same set of friends (e.g., forming a real-world context/circle) as consisting of Alice, Bob himself, Charles and Danielle. Alice may not expressly disapprove of or dislike Danielle, but may simply not consider Danielle to be a part of Alice's conception of the core of Alice's college friend circle. Instead, Alice may consider Danielle just a person on the fringe of Alice's college friend circle. Charles and Danielle may also have slightly differing notions of the same circle of college friends.

Communication products that have tried to help users model and use their circles fall into three basic categories. A first category corresponds to products that ignore the notion of the group, and instead make the user enter the identities of every individual person the user considers to be part of the circle whenever the user attempts to message the circle. A second category corresponds with products that provide stored list functionality that the user may use to create lists of friends. A third category groups products that have a static, global list of members who receive the messages sent to the group. The membership of the group may be decided by several means, including single person administration, group consensus, invitations, free-for-all where anybody can join, as well as other mechanisms that rapidly cause overextension and confusion.

The first category falls short because of the high tedium of entering multiple identifiers whenever a message needs to be sent to a circle. In spite of the rather debilitating defect of the first category, the method of the first category is likely the most used of the three categories noted above.

The second category falls short for at least a couple of reasons. First, the utility of making a list is not apparent while making the list, but becomes apparent when the user sends a message to the addressees contained on the list. Second, the lists are personal to the user and are not shared with anyone else. Hence, each user has to create potentially the same or very similar lists, which few people do because of the inconvenience.

The third category also falls short for at least a couple of reasons. For example, consider the static, globally consistent nature of a group's membership (within or outside the group), where the members of the group membership see the group membership the same way. The members seeing the group membership the same way introduces complications when adding a potential new member to the group. If the potential new candidate is considered to be a core part of the group by everyone else in the group, there may be no issue. However, more often than not, the likely scenario is that some people in the group may consider the potential new candidate to be a core part of the group, while other people in the group may not. If the decision is made to include the potential new candidate as a part of the group, those current members less amenable to the new addition may be less comfortable with the addition and may view the value of the group as being diluted. When enough potential new candidates are added to the group, the group's overall utility reduces down to the point of not being very useful to anyone in the group.

If, on the other hand, the potential new candidate is not included in the group because some members do not consider the potential new candidate to be a core part of the group, the utility of the group also decreases for those members who do consider the potential new candidate to be a core part of the group. When enough of these potential new candidates are excluded from the group, the utility of the group reduces down to the point of the group not being very useful to anyone in the group. Thus, Alice may find the group to be less appealing if the group includes Danielle, whereas Bob may find the group less appealing if the group did not include Danielle. As such, any group model with a single global view of the group membership may suffer from this shortcoming.

SUMMARY

The circle model powered suggestions and activities system provides a way to efficiently and effectively manage relationships. The circle model powered suggestions and activities system provides a way to model relationships for a user and assist the user with creating groupings of relevant constituents into context circles, provide suggested activities to members of the modeled relationships as well as facilitate the user with managing the user's relationships. The system analyzes public and private data, and tracks the user's interactions and the interactions of the constituents' of the user in order to generate suggested activities (including conversation starters) for the users and the constituents of the users. The system refines the semantic analysis and learning algorithms used to perform the analysis by analyzing the activities engaged in by the users and the constituents of the users related to suggested activities.

The system to model social circles of constituents with whom a user desires to interact includes a memory coupled to a processor. The memory includes interaction data from public and private sources for a user and constituents of the user, and processor executable instructions. The instructions when executed by the processor cause the processor to track activities performed by the user including electronic communications. The instructions of the system model one or more social circles of constituents of the user, using the tracked activities. Each social circle represents a circle-context that identifies a group of constituents relevant to the social circle. The instructions of the system organize the activities performed by the user according to one or more modeled social circles of the user. The activities performed by the user may be provided by the one or more merchants (e.g., service providers). The constituents include people and organizations with whom the user interacts, or desires to interact, or with whom the system determines the user has a probability of interest to interact, or any combination thereof.

The instructions of the system create one or more quick-lists from the tracked activities of the user. The modeled social circles include the user identified as the creator, the one or more quick-lists, and a circle-context. The instructions of the system communicate and/or collaborate, using the modeled social circles, with at least one of the constituents of the modeled social circles. The system visualizes a relationship between the user and the constituents of the modeled social circles, and the visualization of the relationship identifies a health of the relationship based on a relationship health value (e.g., frequency of interactions and types of interactions). The relationship health value may be a relative value and/or range from strong relationship, to weak relationship and/or other gradations. The system manages the relationship between the user and the constituents of the modeled social circles, by determining a relationship importance value for the relationship (e.g., an unimportant relationship, and an important relationship).

The instructions of the system generate one or more extended circles that may include the user and the constituents of the modeled social circles identified by the relationship importance value equal to an important relationship. The user may select the scope of the extended circles to include one or more user selected circle-contexts. The system annotates the modeled social circles with meta data by analyzing public data and private data about the user and/or the constituents of the modeled social circles. The system may annotate the modeled social circles with metadata by performing semantic analysis on the public data and private data, and by using machine learning algorithms on the public data and private data. The instructions of the system weight the modeled social circles relative to each other for the user. The instructions of the system may perform, using the modeled social circles, one or more tasks on behalf of and/or for the user, without user interaction. The tasks may include, for example, discovering shared context for interaction within the modeled social circles, suggesting content to the constituents of the modeled social circles and/or the user, suggesting another modeled social circle for the constituents and/or the user to join. The tasks may also include, for example, interacting with the constituents of the modeled social circles, based on the importance of the relationship and/or the relationship health index, and include contextualizing results from a search (e.g., internet search) to the constituents of the modeled social circles, based on the importance of the relationship and/or the relationship health index. The content communicated to the user and/or the constituents may include offers by one or more merchants (e.g., service providers) within a configurable geographical distance of the user and/or the constituents. The content may also include activity suggestions for the user and/or the constituents, and the activity suggestions may include one or more deals offered by the one or more merchants (e.g., service providers). An activity suggestion may require the user to get a configurable number of contacts (e.g., constituents) of the user to commit to the activity suggestion, and the activity suggestion may have an expiration time period within which the suggested activity must be completed by the user and/or the constituents of the user. The system may identify one or more union sets of users and constituents of the users for quick-lists for the users and/or the constituents of the user. The system may also display a subset of the union sets to the users. The displayed subsets of union sets form one or more circle-suggestions for the users. The users may define one or more new social circles and/or one or more new quick-lists, using the one or more circle-suggestions.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Figure 1:
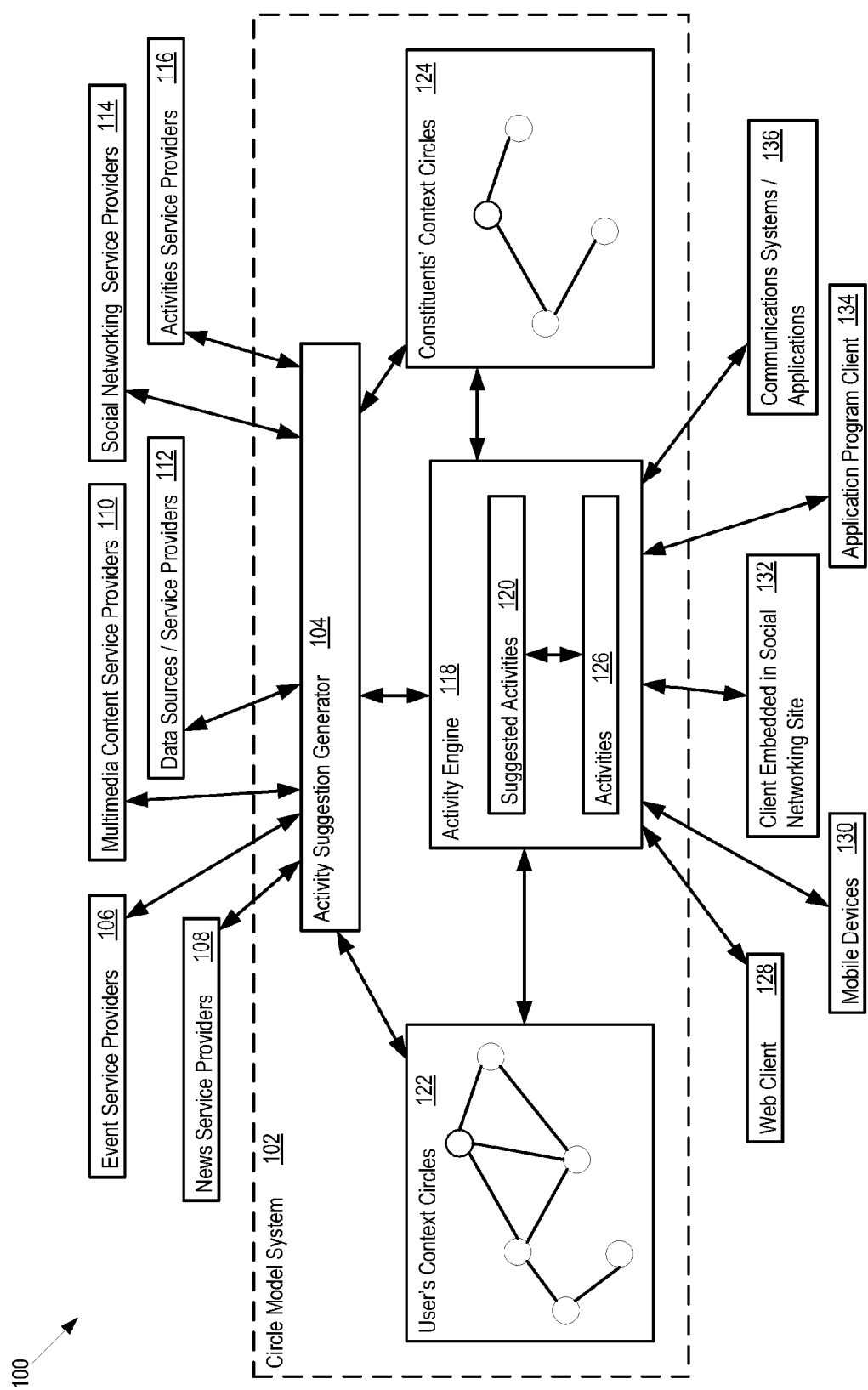
FIG. 1 shows a circle model powered suggestions and activities system configuration.

FIG. 1 shows a circle model powered suggestions and activities system configuration 100. The circle model powered suggestions and activities system (circle model system) configuration 100 includes a circle model system 102 that may include an activity suggestion generator 104 in communication with one or more service providers (106, 108, 110, 112, 114, 116) that provide content and potential activities and offers on activities for users and/or constituents of the users.

The service providers may include for example event service providers 106 that offer tickets to concerts and business and social, as well as other types of events, news and information service providers 108 (e.g., weather reports, entertainment reports, business and sports), multimedia content service providers 110 that provide movies and music, on-line lectures, data sources/service providers 112 such as on-line archives and libraries, social networking service providers 114 (e.g., Facebook® and Linkedin®), and activities service providers 116 (e.g., travel agencies, touring guides, hobby and crafts sites). The circle model system 102 may solicit the service providers (106, 108, 110, 112, 114, 116) for content and potential activities and offers on activities for users and/or constituents of the users. The activity suggestion generator 104 analyzes events, news, and multimedia content from service providers (106, 108, 110, 112, 114, 116) to identify activities that match and/or related in some way to the interests of the user and/or constituents of the user.

The activity suggestion generator 104 may include and/or communicate with an activity engine 118 suggested activities 120. The activity engine may communicate the suggested activities 120 to the user 122 and/or constituents 124 including travel, entertainment, news and information. The activity suggestion generator 104 and/or the activity engine 118 may identify suggested activities 120 on a configurable frequency and rank the suggested activities 120 according to relevance to the user 122 and/or the constituents 124 of the user. When the relevance of a suggested activity 120 satisfies (e.g., meets or exceeds) a probability of interest threshold (e.g., a probability that the user and/or constituents of the user will engage in the suggested activity), the activity engine 118 may communicate the suggested activity 120 to the user 122 and/or the constituents 124. The circle model system 102 and/or the activity engine 118 tracks the activities 126 engaged in by the user and the constituents of the user. The circle model system 102 and/or the activity engine 118 use information about the tracked activities 126 to train semantic analysis and/or learning algorithms used by the circle model system 102 to improve the circle model system's 102 ability to identify the relevance of metadata for the users 122 and/or the constituents 124 and in order to also refine the activities suggested 120 offered to the users 122 and/or the constituents 124.

The circle model system 102 and/or the activity engine 118 tracks the activities 126 engaged in by the users 122 and the constituents 124 through components of the circle model system 102 embedded in applications and/or in communication with the circle model system through other systems and devices including for example web clients 128, mobile devices 130, client embedded components in social networking sites 132, application program clients 134, and communications systems and applications 136 (e.g., email, instant messenger, and short message service (SMS)).

The circle model system enables users to represent and/or model social circles of people with whom the users desire to connect. The modeled social circles enable users to use representations of circles for various purposes, including communicating and collaborating with members of these circles. The system configuration includes a circle model system that assists users to set up the users' various circles of contacts and/or constituents (e.g., friends, colleagues, organizations). The circle model system may operate in communication with other systems (e.g., marketing and advertising systems, and service providers offering suggested activities to the users) to provide users content, suggested activities and offers on deals.

A circle model may be configured to perform actions on behalf of the users. The circle model may be applied to discover interesting shared context for interaction within a circle. Content may be suggested to individuals (e.g., users) within the circle. The circle model may be used to discover and suggest other interesting circles that a user within a circle of which the user may consider to be a part. In addition, the circle model may be used to visualize and manage the health of relationships between one or more users and constituents (e.g., users and non-users that comprise the one or more circles) of the circles. For example, the circle model may maintain relationships with the circle of people (e.g., constituents) that a user considers important. In addition, the circle model may contextualize results from a search (e.g., a web search) to particular circles and communicate information to the user and constituents of the circle based on the contextualization.

Figure 2:
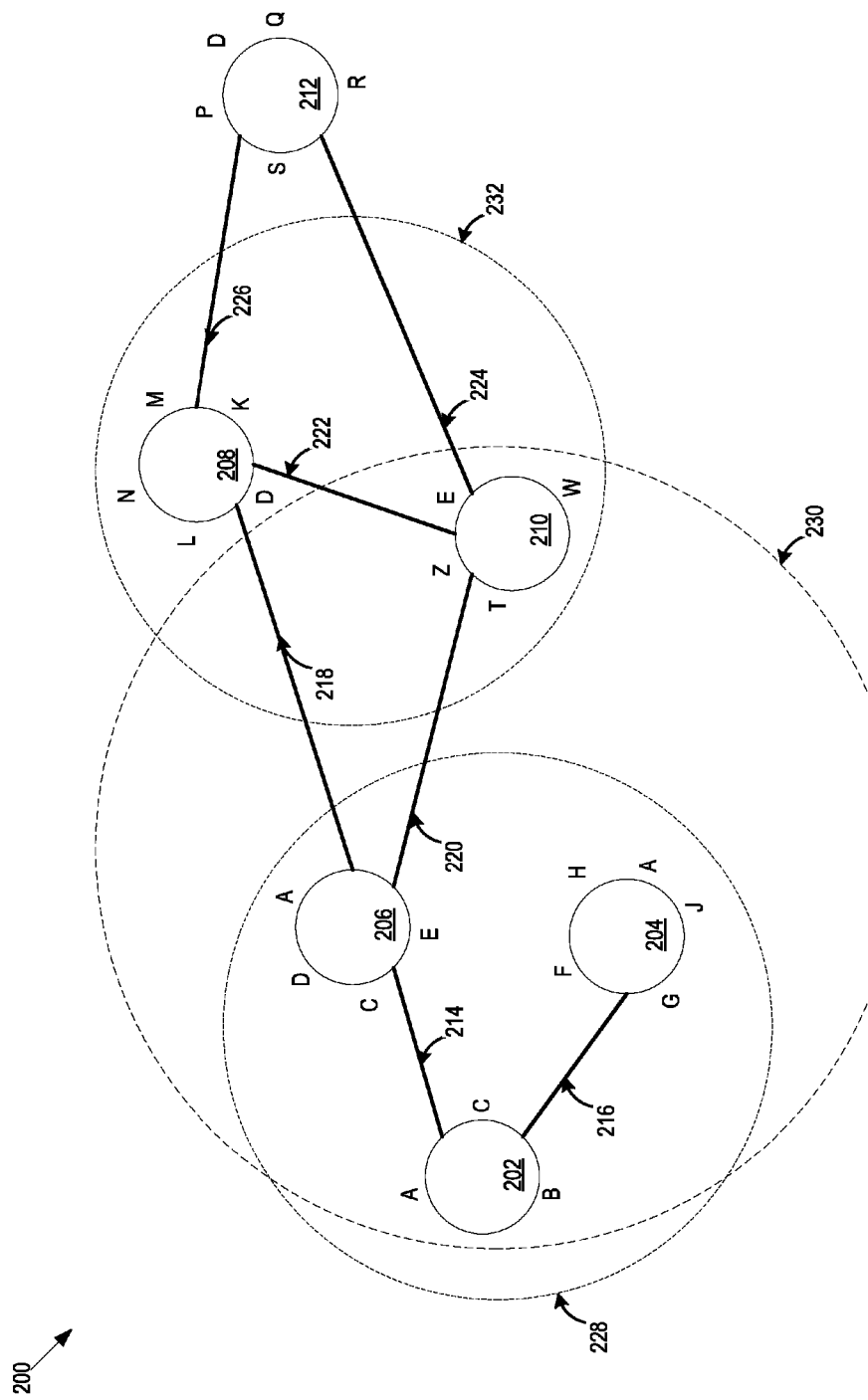
FIG. 2 shows a user's circle-contexts and extended circles.

FIG. 2 shows a user's circle-contexts and extended circles display 200. The circle-contexts defined for a user 'A' may include (202, 204, 206, 208, 210, 212, 214, 216). The circle-contexts defined for a user 'A' may be related based on relevance and frequency of direct or indirect interaction by user 'A' with constituents of 'A' including 'B', 'C', 'D', 'E', 'F', 'G', 'H', 'J', 'K', 'L', 'M', 'N', 'P', 'Q', 'R', 'S', 'T', 'W', and 'Z'. The circle model system 102 may use a crawler (e.g., instructions) to navigate paths (214, 216, 218, 220, 220, 224, 226) to the circle-contexts defined for a user to identify metadata and information to evaluate the user's relationship with the constituents of the user. The circle-contexts (202, 204, 206, 208, 210, 212, 214, 216) show the user 'A' and/or at least one constituent as a member of connected circle-contexts (202, 204), (202, 206), (206, 210), (206, 208), (208, 210), and (208, 212). The circle model system 102 may also provide extended circles (228, 230, 232) that the circle model system 102 derives from the members the user considers important. The circle model system 102 also may provide other interesting sub-groupings (232) of the circle's members that are derived from the user's view of the circle. The circle model system 102 provides the user the ability to define extended circles (228, 230, 232) that the user may use to further facilitate managing the user's relationships. For example, extended circle 228 may group soccer constituents 202, with football constituents 204, and general sports fanatic constituents 206. In another example, extended circle 230 may group the extended circle 228 with bowling league members of circle-context 210 that includes constituent 'E'.

Figure 3:
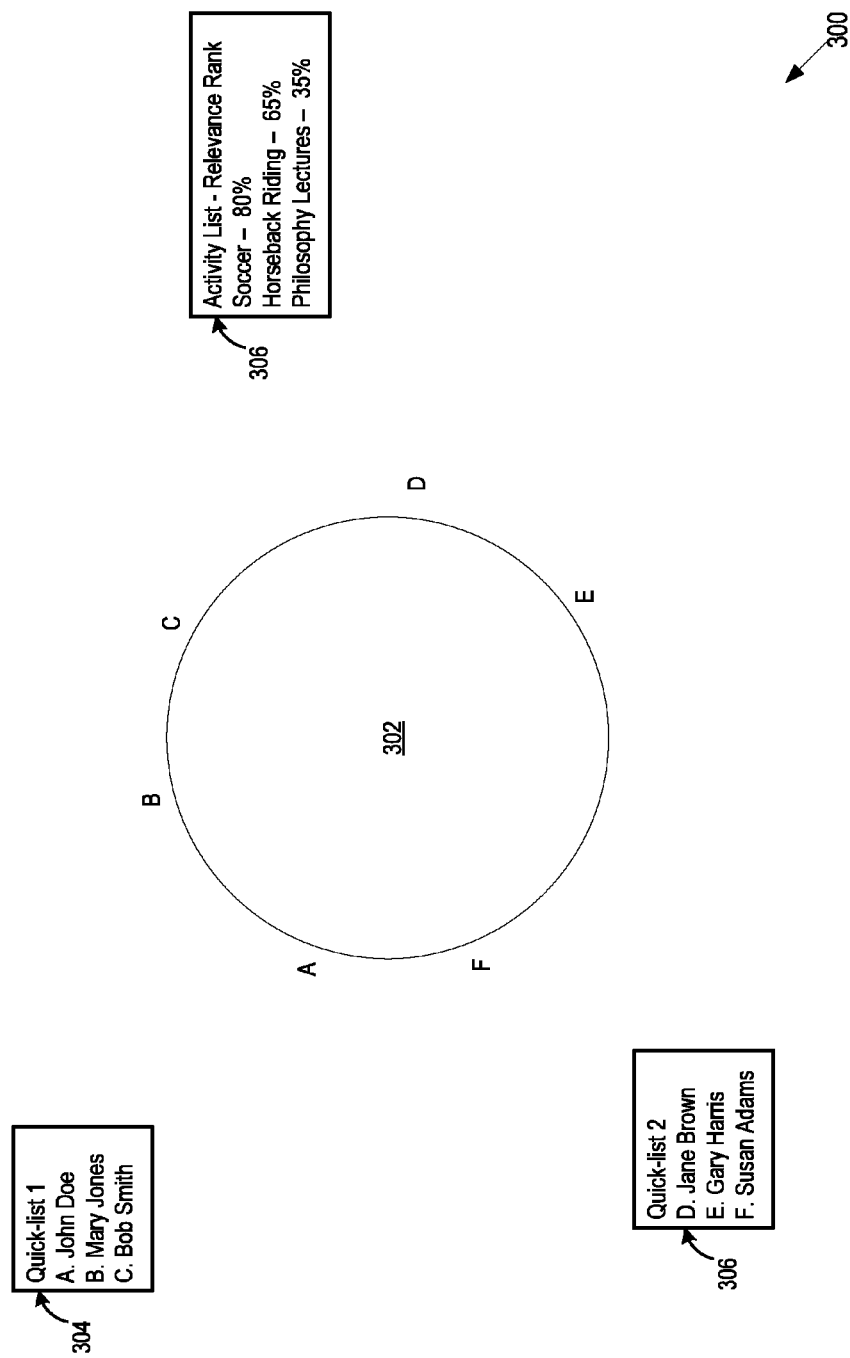
FIG. 3 shows a user's circle-context, quick-lists, and activity list.

FIG. 3 shows a user's circle-context, quick-lists, and activity list display 300. The circle model system 102 provides for each user (e.g., 'A'), and for each circle instantiated by the user, a user's view of the circle 302. The user's view of the circle 302 includes presents the members of the circle 302 (e.g., constituents 'B', 'C', 'D', 'E', 'F') that the user considers a core part of the circle. The circle-context 302 may include the user 'A' and constituents ('B', 'C', 'D', 'E', 'F') from multiple quick-lists (304, 306). The circle-context display 300 may present the user with an activity list and relevance ranking 306 for each activity listed that informs the user the relevance of activities for the user and the constituents of the circle-context 302. The user may use the activity list and relevance ranking 306 to configure selection of suggested activities and trigger starter conversations with constituents. In addition to enabling the user to define circles of friends and/or constituents, the circle model system 102 stores the relative weights of importance of the user's circles.

Figure 4:
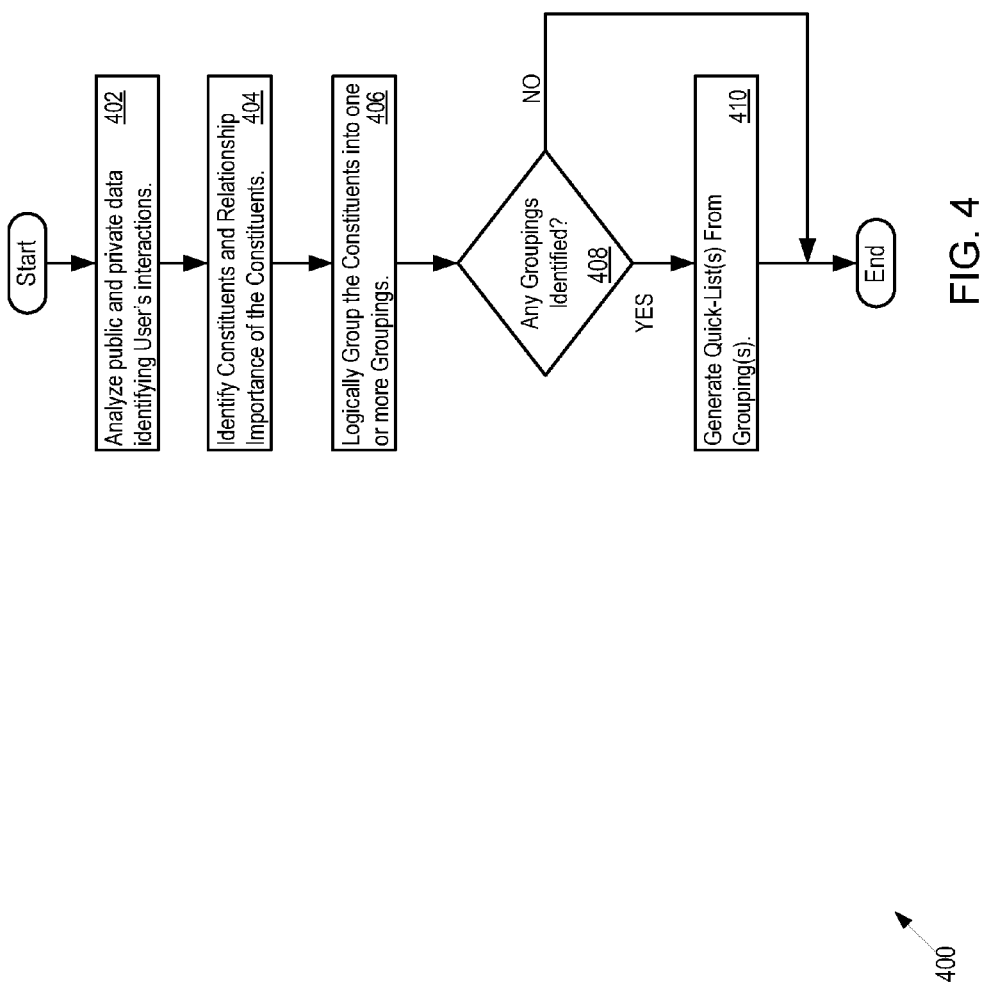
FIG. 4 shows logic flow the circle model system may use to generate a circle-context.

FIG. 4 shows logic flow the circle model system may use to generate a circle-context. The circle model system analyzes public and private data to identify user's interactions (402). For example, when the user registers with the circle model system, the circle model system may analyze the user's emails, Facebook® and Linkedin® contacts to generate a directed graph that visualizes the user's contacts and the importance of the contacts (e.g., degrees of separation, frequency of interactions, and type of communications such as business and/or social communications). The circle model system also tracks the user's interactions in real-time or near real-time and refines the visualization of the user's contacts and the importance of the contacts. The circle model system identifies the user's constituents and the relationship importance of each of the constituents (404) by determining the degrees of separation between the user and contacts identified from the public and private data and the frequency of interaction between the user and the contacts. The circle model system logically groups the constituents into one or more groupings (e.g., relevance and/or context constituents and the user share such mutual interests, activities and affiliations) (406). The circle model system generates one or more quick-lists from the logical groupings for the user to view and select to create circle-contexts (408, 410).

The circle model system enables a user to define various real life circles of people with whom the user interacts. The user may define the people with whom the user interacts without having to enumerate every person in every one of the user's circles. The circle model allows the user to define the circle-contexts without dealing with the awkwardness of excluding people on the fringe of a circle with the knowledge of the excluded persons. The circle models allow the user to avoid the dilution of purpose of the circles caused by including people inappropriate for a circle. The circle model guarantees confidentiality regarding the details about constituents the user considers to belong to the user's circles.

The circle model system is configured to define a circle-context as a global entity common to all users. A circle-context is intended to be a representation of a real life group of people. Further, a quick-list is a list of users created by a user within a circle-context. A quick-list is defined to consist of a creator (e.g., user), a circle-context and a list of one or more constituents (e.g., contacts including other users of the system including people and organization, and non-users). In addition, a view (e.g., also referred to as a circle-context) is a collection of one or more quick-lists, created by a user within a single circle-context. The view includes a creator (e.g., user), a circle-context, and a list of one or more quick-lists.

A user may instantiate one or more circles. To create a circle a user may define a view of a circle-context. If the circle-context that the user desires to define a view of does not exist in the system, the system creates a new circle context and uses the new circle context as a part of the view definition. To create a view for a circle-context, the user creates one or more quick-lists for the circle-context. To create a quick-list, given a circle-context, the user creates a list of users that the user considers important in the context of the circle context. If the circle-context is already defined (e.g., another user defined the same circle-context) in the system, the system may associate the user to the circle-context.

The system creates a union set of the users identified as part of one or more quick-lists defined by one or more users of the system for the circle-context. The system may display a subset of the union set to a user in order to give the user a starting point of people for the user to consider for a circle-context.

The user may also use an instance of a circle-context, as the circle-context appears in a message addressed by another user to the circle-context, to initiate the creation of a quick-list for the circle context. If the circle context is not already defined, the system may give other starting points to the user in the form of circle-suggestions. These circle-suggestions may be generated by a number of techniques, including but not restricted to random subsets of users belonging to existing circle-contexts, and a list of users created from an analysis of a social graph of relationships between all the users connected to the creator-user in the first, second or more degrees (e.g., extended circles). These circle-suggestions may be generated using techniques such as graph-clustering, from a list of users derived from analyzing communication patterns from communication systems such as E-mail, IM, SMS etc, (e.g., a list of users that U addresses joint messages to), a list of users derived from analyzing geo-location information of the user, in conjunction with any other user for whom geo-location information is available, (e.g., to identify sets of users that the user happens to be co-located with a number of times), a random subset of the user's friends from social networking services, and/or any random subset of users of the system or other social networking services.

The user may modify the suggested-list to create the user's own rendition of a quick-list for a circle-context. The system provides the starting point to the user in order to give the user options to consider regarding the circle-context, and partially to suggest a possible quick-list that the user can create on the circle-context. The system provides the circle-suggestion as a starting point for a quick-list. The user may modify the circle-suggestion list by removing users from the circle-suggestion list, or by adding others (e.g., people and/or organizations) who may or may not be users of the system. In particular, the quick-list is a group of constituents that the user expects to address as a logically consistent unit important to the user in the context of the circle-context.

The circle model system may be configured to provide server services for other systems (e.g., marketing and advertising systems, and service providers). For example, the circle model system may be configured to provide, for each user, the circle-contexts for which the user has defined views. These views are the "circles" that the user has identified for the user. For each circle-context, the quick lists that the user has defined for each circle-context includes a list of users that result from the union of the constituents from multiple quick-lists defined for the circle-context. The quick-lists include constituents that the system identifies as quick-list-reachable from the user. The circle model system quick-list-reachable people for the user as a list of users that the user tends to address as a group, for example as determined by performing frequency analysis on the user's communication within the system, and the circle-contexts that included the user by other users.

Table 1 shows sample pseudo-code for computing lists of constituents (e.g., other users, non-users, organizations) that are quick-list-reachable from user (U) for quick-list (Q) given a circle-context (CC), using set operations UNION and MINU.

TABLE 1

Computing Quick-List-Reachable Lists of Constituents

```
QLR(U, Q, CC) = empty-set ;
visited = empty-set;
to_visit = { U };
while (to_visit is not empty) {
    pop an element x from to_visit
    quicklists = quicklists created for circle-context CC by user x;
    for each quick-list Q in quicklists {
        QLR(U,Q,CC) = QLR(U,Q,CC) UNION Q;
        unvisited = Q MINUS visited;
        to_visit = to_visit UNION unvisited;
    }
}
return QLR(U, Q, CC)
```

Figure 5:
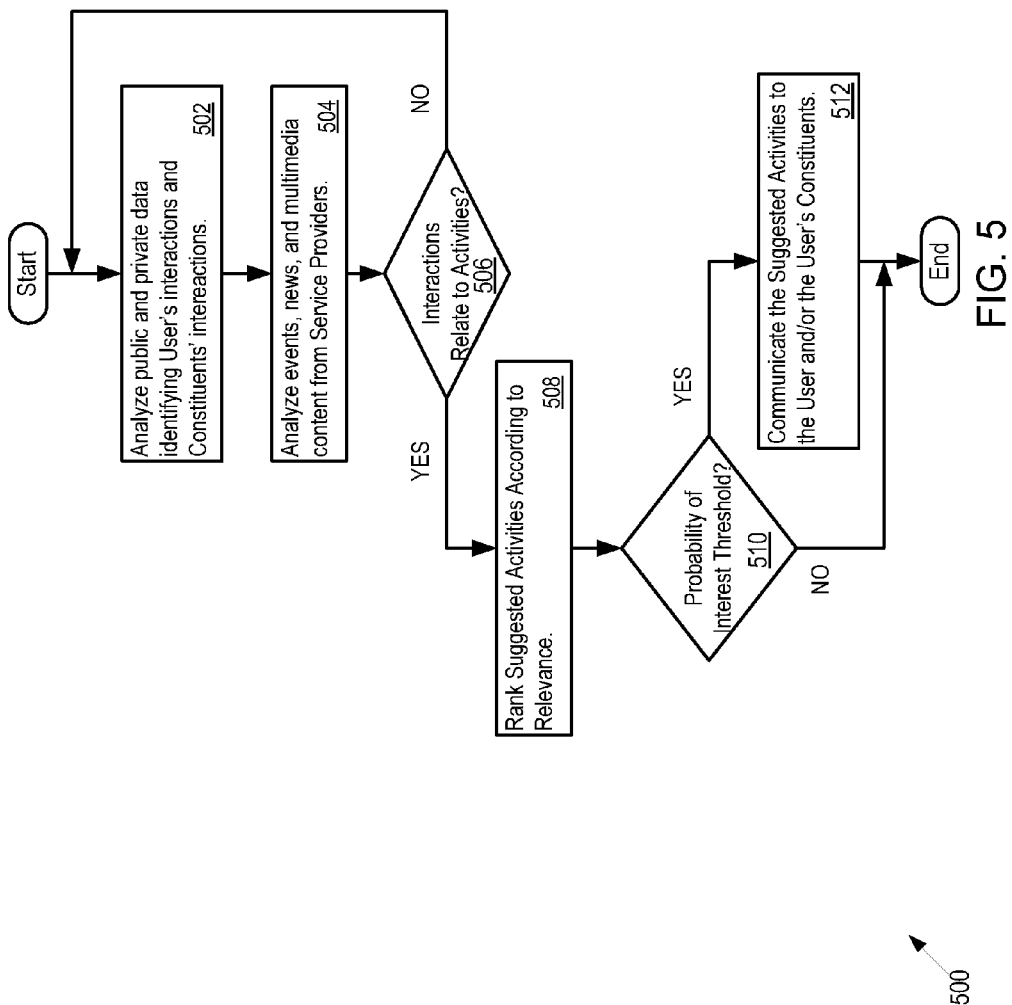
FIG. 5 shows logic flow the circle model system may use to generate suggested activities.

FIG. 5 shows logic flow the circle model system may use to generate suggested activities. The circle model system analyzes public and private data to identify the user's interactions and constituents' interactions (502). For example, the user and some of the constituents of the user may share interests in soccer evidenced by interactions by the user and constituents looking up soccer game scores, team schedules, soccer equipment and tickets to soccer games. In another example, although the interactions by the user do not reveal an interest in soccer, because a statistically significant number of the interactions by the user's constituents reveal an interest in soccer the circle model system considers soccer a possible interest of the user. The user may be interested in an activity because a significant number of the user's constituents are interested in the activity. The circle model system may use the strength of the user's relationship with one or more constituents to determine conversation starters to initiate communication that results in engaging the user and/or constituents in one or more suggested activities.

The circle model system analyzes events, news, and multimedia content from service providers to identify activities that match and/or related in some way to the interests of the user and/or constituents of the user (504, 506). For example, the circle model system may identify the user's interest in playing soccer with friends, and identify from the information available from various service providers that the weather during the week will be ideal for outdoor activities and that venues (e.g., open fields, soccer facilities) are available during the week. The circle model system may communicate suggested activities to the user and/or constituents suggesting that the user and/or constituents consider playing soccer during the week and even provide locations (e.g., venues) and times to play soccer with friends. Similarly, the circle model system may communicate various suggested activities to the user and/or constituents including travel, entertainment, news and information.

The circle model system may identify one or more suggested activities on a configurable frequency and rank the suggested activities according to relevance to the user and/or constituents of the user (508). When the relevance of a suggested activity satisfies (e.g., meets or exceeds) a probability of interest threshold (e.g., a probability the user and/or constituents of the user will engage in the suggested activity) (510), the circle model system communicates the suggested activity to the user and/or constituents (512).

The system architecture may include an activity suggestion generator that utilizes inputs from service providers, the circle views provided by the circle model system and inputs from the various intelligent agents used to retrieve information from various sources to generate activity suggestions for the user. The suggested activities include suggestions the user's friends (e.g., constituents) from one or more circles may find appealing. The activity suggestion generator may use the circle relevance to compute the most relevant suggestions.

Further, the suggested activities for the user and the user's circle of constituents (e.g., friends and organizations) include circle relevant local deals (e.g., deals sourced from merchants close to the user's location, same city as the user or close to the user's zip code). The circle relevance algorithm matches up these deals with users in the context of one or more of the users' circles to produce activity suggestions for the user and the user's friends that consist of local deals.

The suggested activities may require the user to get a group of the users' friends to commit to the activity, before an incentive inherent in the activity becomes active (e.g., four of the user's friends may need to commit to a white water rafting trip, before a discounted price may be accessed by the user and/or the user's friends). In addition, suggestions that require the user to get a group of the user's friends to commit to the activity may have an expiration time associated with the activity, and become unavailable in the event the user is unable to get the requisite number of the user's friends to commit to the activity.

The user engages in different types of activities within the system, alone or with one or more of the user's friends. The different types of activities may include talking, making a photo album or scrapbook, and playing a game. The system architecture includes an activity engine subsystem that uses circles provided by the circle model system to organize the user's activities by the various circles associated with the user.

The activities in which the user engages may be provided by service providers in addition to or rather than the circle model system. These providers may have access to an application programming interface (API) that allows the service providers' activities to be made available to the user. In addition, the activities that pertain to a particular user may be made available to the user on various destinations, including a website, a mobile application, a client embedded in a social networking site, a desktop computer software application. The user may access activities by using communication systems such as email, instant messenger, and short message service (SMS).

A circle annotator subsystem annotates circles defined by a user, and each list served up by the circle model system in the context of a circle with data that may be gathered about the members of the list. The circle annotator subsystem gathers the data from public sources, as well as sources where the user's credentials allow the circle annotator subsystem to access data not otherwise publicly available, but available to the user.

Content includes any commercial or non-commercial content, such as online content, videos, articles, music, as well as activities and event suggestions. The circle model system may present content to a group of relevant users, where relevancy is defined by a user's interests, a user's circle's interests, location, mobile access, and time. Based on clicks (e.g., user interactions), activity creation, recommendations and communications about the presented content, which may include ratings and/or expressions of explicit interest in the content by the user, the content piece moves through the system. The circle model system ranks the relevancy of the content, and the highest ranking content may be shared and suggested by the system to similar users and other user circles.

The architecture may include an activity suggestion generator in which suggestions (e.g., suggested activities and content) may be distributed to circle constituents. The architecture may be configured for circle relevance or circle relevant local deals in which topics and information of interest within the circle may be evaluated and shared within the circle. Moreover, the topics or information may extend to deals local to members within the circle and thereby leverage information deemed relevant within the circle. Alternatively, the architecture may be configured for activity suggestions which require group participation to redeem, potentially with time limits. For example, a particular activity or event relevant to the circle may be activated responsive to extracting particular behavior from the collective circle. Such behavior is likely to have a predictive outcome based on the closeness of the constituents of the circle by identifying the likelihood of assembly (e.g., participation by the constituents). In another example, the architecture may be configured to expose a circle model to third-party activity providers and/or third-party websites and/or software. The architecture may include an activity engine that monitors the activities engaged in by the users and constituents of the circles.

Figure 6:
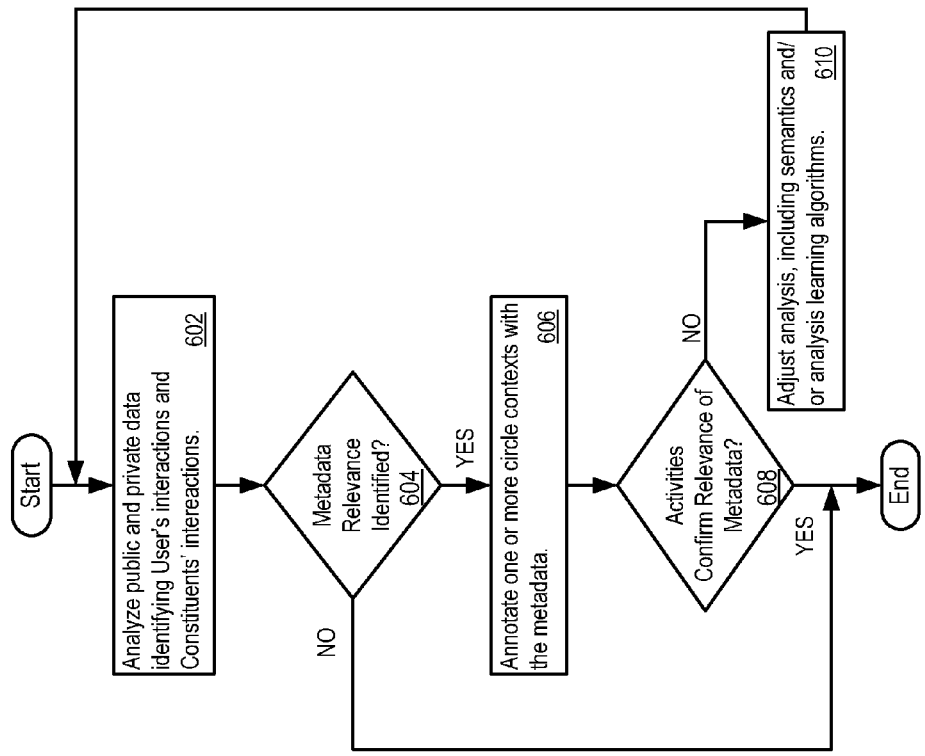
FIG. 6 shows logic flow the circle model system may use to annotate a circle-context.

FIG. 6 shows logic flow the circle model system may use to annotate a circle-context. The circle model system enables attaching relevant metadata to each circle by a circle annotator, for example the "context" of a circle determined by analyzing public and private data. The circle annotator annotates the circles of a user with metadata generated from the analysis of data about the user and/or the constituents using public and privately available data (602). For example, if the user and a circle of the user's friends all declared an interest in a music band (e.g., Dave Matthews Band, on a music website) this information may be attached to the circle by the circle annotator. The relevance of the metadata is identified using semantic analysis and/or learning algorithms (604) on available data pertaining to each circle, the user and/or the constituents of the user. The circle annotator may use the metadata identified as relevant to annotate each circle-context of the user (606). The circle model system tracks the activities engaged in by the user and the constituents of the user, and uses information about the tracked activities to train the semantic analysis and/or learning algorithms to improve the circle model system's and/or the circle annotator's ability to identify the relevance of metadata for the user and/or the constituents of the user (608, 610).

The system architecture may use an intelligent agent (e.g., intelligent agent systems) that utilizes the circle views to efficiently retrieve information from various information sources, both public information and private information available to the user using the user's credentials. The circle model systems directs the intelligent agents towards those parts of the information provided by the various information sources (e.g., service providers) considered relevant to the context of one or more of the user's circles and/or the constituents of the user.

Figure 7:
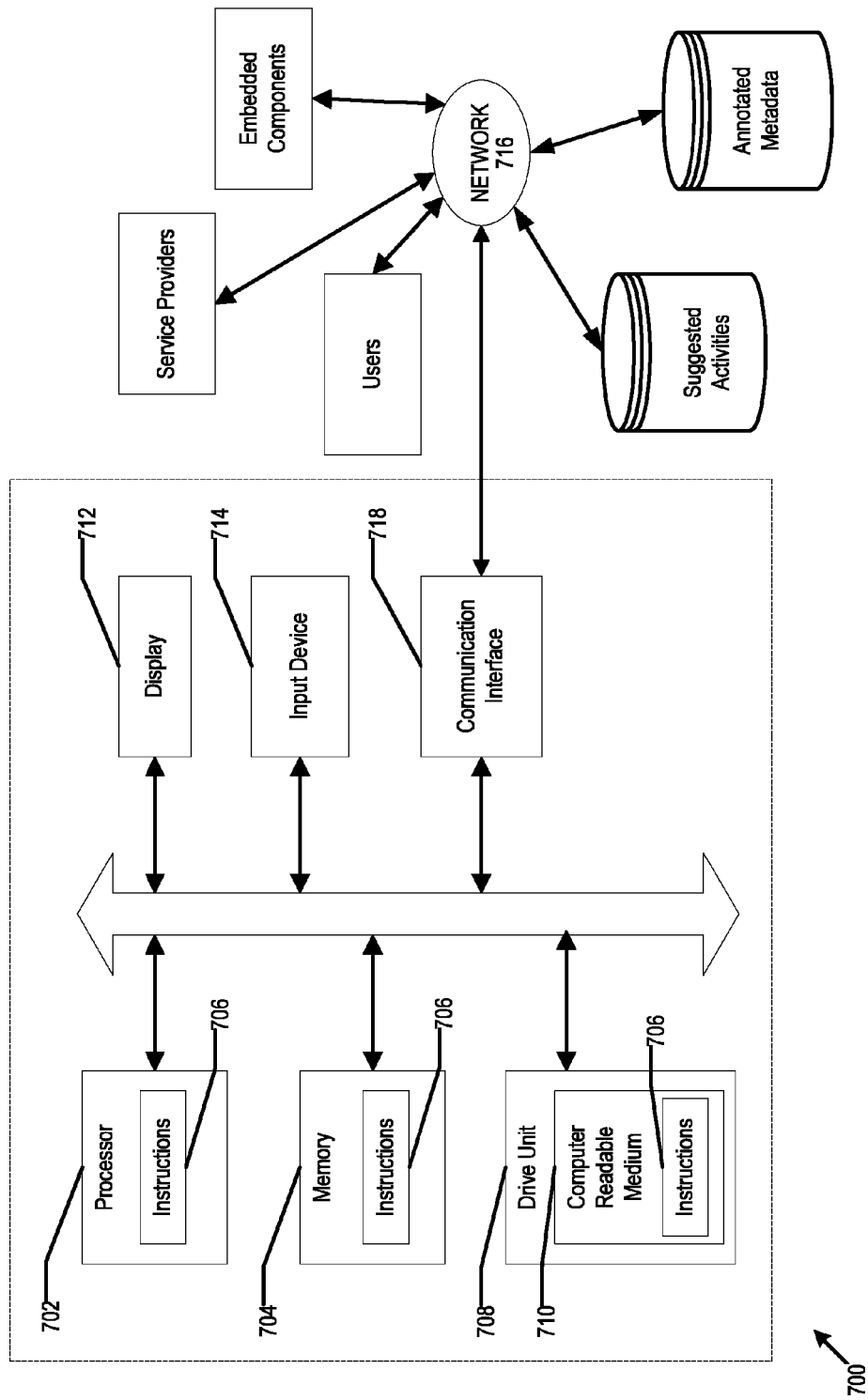
FIG. 7 shows other components of the circle model powered suggestions and activities system configuration.

FIG. 7 shows other components of the circle model powered suggestions and activities system configuration. The system may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 702, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or any other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory 704 that can communicate via a bus. The memory may be a main memory, a static memory, or a dynamic memory. The memory may include, but may not be limited to computer readable 710 storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions 706 executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display 712, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit 708.

Additionally, the computer system may include an input device 714 configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, may be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network 716 may communicate voice, video, audio, images or any other data over the network. Further, the instructions may be transmitted or received over the network via a communication interface 718. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. A method to model social circles of constituents with whom a user desires to interact, the method comprising:

causing, by an activity engine of a circle model system, a mobile device associated with a user to embed one or more client software components in one or more applications executable by the mobile device associated with the user;

tracking, by the activity engine and based on data received via the one or more embedded client software components, activities performed by the user on (a) the mobile device associated with the user, the activities provided by one or more merchants and including electronic communications;

modeling, by the activity engine and using the tracked activities, one or more social circles of constituents of the user, wherein each of the social circles represents a circle-context that identifies a group of constituents;

organizing, by the activity engine, the tracked activities performed by the user according to one or more modeled social circles of the user;

weighting each of the one or more modeled social circles for the user relative to another of the one or more modeled social circles;

suggesting, by the circle model system and without user interaction, a modeled social circle for at least one of the constituents of the one or more modeled social circles or the user to join; and without user interaction, contextualizing results from a web search to the at least one of the constituents of the one or more modeled social circles based on an importance of a relationship between the user and the at least one of the constituents and further based on a relationship health index.

2. The method of claim 1, wherein the constituents include people and organizations with whom the user interacts, or desires to interact, or whom the user is determined to have a probability of interest to interact, or any combination thereof.

3. The method of claim 1, further comprising:
creating one or more quick-lists from the tracked activities of the user, where the modeled social circles comprise: the user identified as the creator; the one or more quick-lists; and a circle-context.

4. The method of claim 1, further comprising:
communicating, using the one or more modeled social circles, with the at least one of the constituents of the one or more modeled social circles;
collaborating, using the one or more modeled social circles, with the at least one of the constituents of the one or more modeled social circles;
visualizing the relationship between the user and the at least one of the constituents of the one or more modeled social circles, wherein the visualization of the relationship identifies a health of the relationship based on a relationship health value, wherein the relationship health value is from a group consisting of: strong relationship; and weak relationship; and
managing the relationship between the user and the at least one of the constituents of the one or more modeled social circles, by determining a relationship importance value for the relationship, wherein the relationship importance value is from a group consisting of: an unimportant relationship; and an important relationship.

5. The method of claim 4, further comprising:
generating an extended circle comprising the user and the at least one of the constituents of the one or more modeled social circles identified by the relationship importance value equal to an important relationship; and
annotating the one or more modeled social circles with meta data by analyzing public data and private data about the at least one of the constituents of the one or more modeled social circles, wherein annotating the one or more modeled social circles with meta data includes performing semantic analysis on the public data and private data and using machine learning algorithms on the public data and private data.

6. The method of claim 1, further comprising:
performing, using the one or more modeled social circles and without user interaction, one or more tasks of:
discovering shared context for interaction within the one or more modeled social circles;
suggesting content to the at least one of the constituents of the one or more modeled social circles or the user; and
interacting with the at least one of the constituents of the one or more modeled social circles, based on the importance of the relationship and the relationship health index.

7. The method of claim 6, wherein the content includes:
offers by the one or more merchants within a configurable geographical distance of the user or the at least one of the constituents of the one or more modeled social circles; and
activity suggestions for the user or the at least one of the constituents of the one or more modeled social circles, wherein the activity suggestions include one or more deals by the one or more merchants.

8. The method of claim 7, wherein at least one of the activity suggestions require the user to get a configurable number of contacts of the user to commit to the at least one of the activity suggestions, and wherein at least one of the activity suggestions has an expiration time period within which the at least one of the activity suggestions must be completed.

9. The method of claim 3, further comprising:
identifying one or more union sets of users and constituents of the users for the users and the constituents of the one or more quick-lists;
displaying a subset of the one or more union sets to the users, wherein the displayed subset of the one or more union sets form one or more circle-suggestions for the users; and
defining one or more new social circles or one or more new quick-lists using the one or more circle-suggestions.

10. A system to model social circles of constituents with whom a user desires to interact, the system comprising:
a memory coupled to a processor, the memory storing interaction data from public and private sources for a user and constituents of the user; and
processor executable instructions that, when executed by the processor, cause the processor to:
cause a mobile device associated with a user to embed one or more client software components in one or more applications executable by the mobile device associated with the user;
based on data received via the one or more embedded client software components, track activities performed by the user on the mobile device associated with the user, the tracked activities including electronic communications;
model, using the tracked activities, one or more social circles of constituents of the user, wherein each of the social circles represents a circle-context that identifies a group of constituents;
organize the tracked activities performed by the user according to one or more modeled social circles of the user, wherein the tracked activities performed by the user are provided by the one or more merchants;
weight each of the one or more modeled social circles for the user relative to another of the one or more modeled social circles;
suggest another modeled social circle for the at least one of the constituents of the one or more modeled social circles or the user to join; and
without user interaction, contextualize results from a web search to the at least one of the constituents of the one or more modeled social circles
based on an importance of a relationship between the user and the at least one of the constituents and further based on a relationship health index.

11. The system of claim 10, wherein the constituents include people and organizations with whom the user interacts, or desires to interact, or whom the user is determined to have a probability of interest to interact, or any combination thereof.

12. The system of claim 10, wherein the instructions, when executed by the processor, further cause the processor to:
create one or more quick-lists from the tracked activities of the user, where the modeled social circles comprise: the user identified as the creator; the one or more quick-lists; and a circle-context.

13. The system of claim 10, wherein the instructions, when executed by the processor, further cause the processor to:

communicate, using the one or more modeled social circles, with at least one of the constituents of the one or more modeled social circles;

collaborate, using the one or more modeled social circles, with at least one of the constituents of the one or more modeled social circles;

visualize a relationship between the user and the at least one of the constituents of the one or more modeled social circles, wherein the visualization of the relationship identifies a health of the relationship based on a relationship health value, wherein the relationship health value is from a group consisting of: strong relationship; and weak relationship; and manage the relationship between the user and the at least one of the constituents of the one or more modeled social circles, by determining a relationship importance value for the relationship, wherein the relationship importance value is from a group consisting of: an unimportant relationship; and an important relationship.

14. The system of claim 13, wherein the instructions, when executed by the processor, further cause the processor to:

generate an extended circle comprising the user and the at least one of the constituents of the one or more modeled social circles identified by the relationship importance value equal to an important relationship; and annotate the one or more modeled social circles with meta data by analyzing public data and private data about the at least one of the constituents of the one or more modeled social circles, wherein annotating the one or more modeled social circles with meta data includes performing semantic analysis on the public data and private data and using machine learning algorithms on the public data and private data.

15. The system of claim 10, wherein the instructions, when executed by the processor, further cause the processor to:

perform, using the one or more modeled social circles and without user interaction, one or more of:

discovering shared context for interaction within the one or more modeled social circles;

suggesting content to the at least one of the constituents of the one or more modeled social circles or the user; and interacting with the at least one of the constituents of the one or more modeled social circles, based on the importance of the relationship and the relationship health index.

16. The system of claim 15, wherein the content includes:

offers by the one or more merchants within a configurable geographical distance of the user or the at least one of the constituents of the one or more modeled social circles; and activity suggestions for the user or the at least one of the constituents of the one or more modeled social circles, wherein the activity suggestions include one or more deals by the one or more merchants.

17. The system of claim 16, wherein at least one of the activity suggestions require the user to get a configurable number of contacts of the user to commit to the at least one of the activity suggestions, and wherein at least one of the activity suggestions has an expiration time period within which the at least one of the activity suggestions must be completed.

18. The system of claim 12, wherein the instructions, when executed by the processor, further cause the processor to:

identifying one or more union sets of users and constituents of the users for the users and the constituents of the one or more quick-lists;

displaying a subset of the one or more union sets to the users, wherein the displayed subset of the one or more union sets form one or more circle-suggestions for the users; and defining one or more new social circles or one or more new quick-lists using the one or more circle-suggestions.

19. A non-transitory computer-readable medium having stored thereon processor executable instructions to model social circles of constituents with whom a user desires to interact, wherein the processor executable instructions, when executed by the processor, cause the processor to:

cause a mobile device associated with a user to embed one or more client software components in one or more applications executable by the mobile device associated with the user;

based on data received via the one or more embedded client software components, track activities performed by the user on the mobile device associated with the user, the tracked activities including electronic communications;

model, using the tracked activities, one or more social circles of constituents of the user, wherein each of the social circles represents a circle-context that identifies a group of constituents;

organize the tracked activities performed by the user according to one or more modeled social circles of the user, wherein the tracked activities performed by the user are provided by the one or more merchants;

weight each of the one or more modeled social circles for the user relative to another of the one or more modeled social circles;

suggest another modeled social circle for the at least one of the constituents of the one or more modeled social circles or the user to join; and without user interaction, contextualize results from a web search to the at least one of the constituents of the one or more modeled social circles based on an importance of a relationship between the user and the at least one of the constituents and further based on a relationship health index.

20. The computer-readable medium of claim 19, wherein the constituents include people and organizations with whom the user interacts, or desires to interact, or whom the user is determined to have a probability of interest to interact, or any combination thereof.

21. The computer-readable medium of claim 19, wherein the instructions, when executed by the processor, further cause the processor to:

create one or more quick-lists from the tracked activities of the user, where the modeled social circles comprising: the user identified as the creator; the one or more quick-lists; and a circle-context.

22. The computer-readable medium of claim 19, wherein the instructions, when executed by the processor, further cause the processor to:

communicate, using the one or more modeled social circles, with at least one of the constituents of the one or more modeled social circles;

collaborate, using the one or more modeled social circles, with at least one of the constituents of the one or more modeled social circles;

visualize a relationship between the user and the at least one of the constituents of the one or more modeled social circles, wherein the visualization of the relationship identifies a health of the relationship based on a relationship health value, wherein the relationship health value is from a group consisting of: strong relationship; and weak relationship; and manage the relationship between the user and the at least one of the constituents of the one or more modeled social circles, by determining a relationship importance value for the relationship, wherein the relationship importance value is from a group consisting of: an unimportant relationship; and an important relationship.

23. The computer-readable medium of claim 22, wherein the instructions, when executed by the processor, further cause the processor to:
generate an extended circle comprising the user and the at least one of the constituents of the one or more modeled social circles identified by the relationship importance value equal to an important relationship; and
annotate the one or more modeled social circles with meta data by analyzing public data and private data about the at least one of the constituents of the one or more modeled social circles, wherein annotating the one or more modeled social circles with meta data includes performing semantic analysis on the public data and private data and using machine learning algorithms on the public data and private data.

24. The computer-readable medium of claim 19, wherein the instructions, when executed by the processor, further cause the processor to:
perform, using the one or more modeled social circles and without user interaction, one or more of:
discovering shared context for interaction within the one or more modeled social circles;
suggesting content to the at least one of the constituents of the one or more modeled social circles or the user; and interacting with the at least one of the constituents of the one or more modeled social circles, based on the importance of the relationship and the relationship health index.

25. The computer-readable medium of claim 24, wherein the content includes:
offers by the one or more merchants within a configurable geographical distance of the user or the at least one of the constituents of the one or more modeled social circles; and
activity suggestions for the user or the at least one of the constituents of the one or more modeled social circles, wherein the activity suggestions include one or more deals by the one or more merchants.

26. The computer-readable medium of claim 25, wherein at least one of the activity suggestions require the user to get a configurable number of contacts of the user to commit to the at least one of the activity suggestions, and wherein at least one of the activity suggestions has an expiration time period within which the at least one of the activity suggestions must be completed.

27. The computer-readable medium of claim 21, wherein the instructions, when executed by the processor, further cause the processor to:
identify one or more union sets of users and constituents of the users for the users and the constituents of the one or more quick-lists;
display a subset of the one or more union sets to the users, wherein the displayed subset of the one or more union sets form one or more circle-suggestions for the users; and
define one or more new social circles or one or more new quick-lists using the one or more circle-suggestions.

* * * * *